(12) United States Patent
Wang

(10) Patent No.: US 7,204,905 B2
(45) Date of Patent: Apr. 17, 2007

(54) METHOD FOR FORMING LAMINATED SYNTHETIC LEATHER

(76) Inventor: Swei Mu Wang, P.O. Box 63-99, Taichung (TW) 406

( * ) Notice: Subject to any disclaimer, the term of this patent is extended or adjusted under 35 U.S.C. 154(b) by 367 days.

(21) Appl. No.: 10/836,553

(22) Filed: Apr. 29, 2004

(65) Prior Publication Data

US 2005/0241749 A1  Nov. 3, 2005

(51) Int. Cl.
*B29C 47/04* (2006.01)
(52) U.S. Cl. ............... 156/209; 156/238; 156/244.24; 156/244.26; 156/244.27; 156/231
(58) Field of Classification Search ........... 156/244.24, 156/244.26, 244.27
See application file for complete search history.

(56) References Cited

U.S. PATENT DOCUMENTS 2,714,571 A * 8/1955 Irion et al. ............. 156/244.24
3,058,863 A * 10/1962 Gaines et al. ............... 428/114
4,784,919 A * 11/1988 Tokuno et al. ............... 428/500
5,833,792 A * 11/1998 Funaki et al. .......... 156/244.27
2003/0075264 A1 * 4/2003 Terakado et al. ...... 156/244.24
2005/0106965 A1 * 5/2005 Wevers et al. ................ 422/85

* cited by examiner

*Primary Examiner*—Richard Crispino
*Assistant Examiner*—Barbara J. Musser
(74) *Attorney, Agent, or Firm*—Charles E. Baxley

(57) ABSTRACT

A method for forming a laminated synthetic leather includes engaging a textile carrier onto a carrying roller and engaging a release liner onto a lamination roller, extruding one or more materials with an extruder machine into a film, and feeding the film downwardly onto the release liner and to have the film carried on the release liner, and to have the film and the release liner to be suitably cooled by the lamination roller. The film and the textile carrier may be compressed together with the rollers, to form the laminated synthetic leather. The release liner may include one or more flat or spatial patterns for transmitting to the film.

16 Claims, 3 Drawing Sheets

METHOD FOR FORMING LAMINATED SYNTHETIC LEATHER

The present invention is related to U.S. patent application Ser. No. 10/817,277, filed on 1 Apr. 2004, pending.

BACKGROUND OF THE INVENTION

1. Field of the Invention

The present invention relates to a method, and more particularly to a method for manufacturing or forming laminated synthetic leather.

2. Description of the Prior Art

Typically, for manufacturing or forming laminated synthetic leathers, a soft or melted coating is heated or melted or extruded from an extruder machine into a film, and then pressed onto a textile carrier with rollers, in order to solidly secure the film of the soft or melted coating onto the textile carrier.

For example, a typical extrusion-coating method may be provided for pressing a film or a coating of soft polyvinyl chloride (PVC) materials onto a textile carrier with two rollers. The textile carrier is viscose and heated by contact with a heated lamination roller.

For allowing the soft PVC coating or film to be solidly attached or secured onto the textile carrier, in the compression region between the film of the soft or melted coating and the textile carrier, the PVC film is not initially cooled so much that it loses its thermoplastic workability, and the textile carrier is heated so that the PVC film applied penetrates into the textile carrier to a greater extent.

However, on subsequent cooling, the PVC film loses its workability and flexibility, such that a great portion of the textile carrier will also lose its workability and flexibility, and such that the users may not feel soft or flexible or comfortable when wearing a cloth manufactured with such laminated synthetic leathers.

In addition, normally, the soft PVC coating or film will be directly and solidly attached or secured onto the textile carrier, and the textile carrier is normally flexible and may not have spatial patterns formed or provided thereon, such that it will be difficult to form spatial patterns on the soft PVC coating or film.

The present invention has arisen to mitigate and/or obviate the afore-described disadvantages of the conventional methods for manufacturing or forming laminated synthetic leathers.

SUMMARY OF THE INVENTION

The primary objective of the present invention is to provide a method for manufacturing or forming laminated synthetic leather and for preventing the soft film or coating from penetrating into the textile carrier to a greater extent, and thus for forming a soft or flexible laminated synthetic leather.

The other objective of the present invention is to provide a method for manufacturing or forming laminated synthetic leather and for forming spatial patterns on the soft film or coating with one or more peel-away release liners.

In accordance with one aspect of the invention, there is provided a method for manufacturing or forming a laminated synthetic leather, the method comprising providing a carrying roller, engaging a textile carrier onto the carrying roller, providing and disposing a lamination roller beside the carrying roller, and spaced away from the carrying roller, engaging a release liner onto the lamination roller, the release liner including a surface having a spatial pattern provided thereon, providing an extruder machine to extrude a material into a film, and downwardly feeding the film onto the release liner that is carried on the lamination roller, to have the film carried on the lamination roller, and compressing the release liner and the film and the textile carrier together with the carrying roller and the lamination roller, to form the laminated synthetic leather, and to have the spatial pattern on the release liner to be imprinted or transmitted onto the film, in order to form a corresponding spatial pattern on the film.

The lamination roller may further be cooled to suitably cool the release liner and thus the film. For example, a passage may be formed or provided in the lamination roller, and a cooling fluid is fed through the passage of the lamination roller, to suitably cool the release liner and the film.

A foamable agent may further be provided and introduced into the material for forming the film, and for increasing a softness of the film, or for forming the film into a porous structure having a plurality of perforations formed therein.

The material may be selected from various kinds of different thermoplastic polymer materials. For example, the thermoplastic polymer materials may be thermoplastic urethane (TPU)+styrene butadiene rubber (SBR), thermoplastic urethane (TPU)+styrene ethylene butylenes styrene block copolymer (SEBS), thermoplastic urethane (TPU)+thermoplastic rubber (TPR), or thermoplastic urethane (TPU)+ethylene propylene diene monomer rubber (EPDM).

It is preferable that the peel-away release liners may include various or different flat patterns and/or spatial patterns formed or applied or provided thereon, and the peel-away release liners may be selectively or changeably engaged or attached onto the lamination roller and the carrying roller, in order to form or imprint various or different patterns onto the film.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 2:
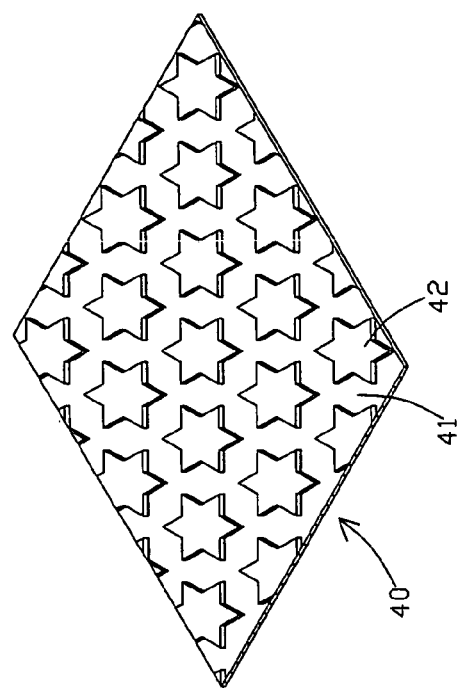
FIG. 2 is a perspective view illustrating a peel-away release liner.
Figure 1:
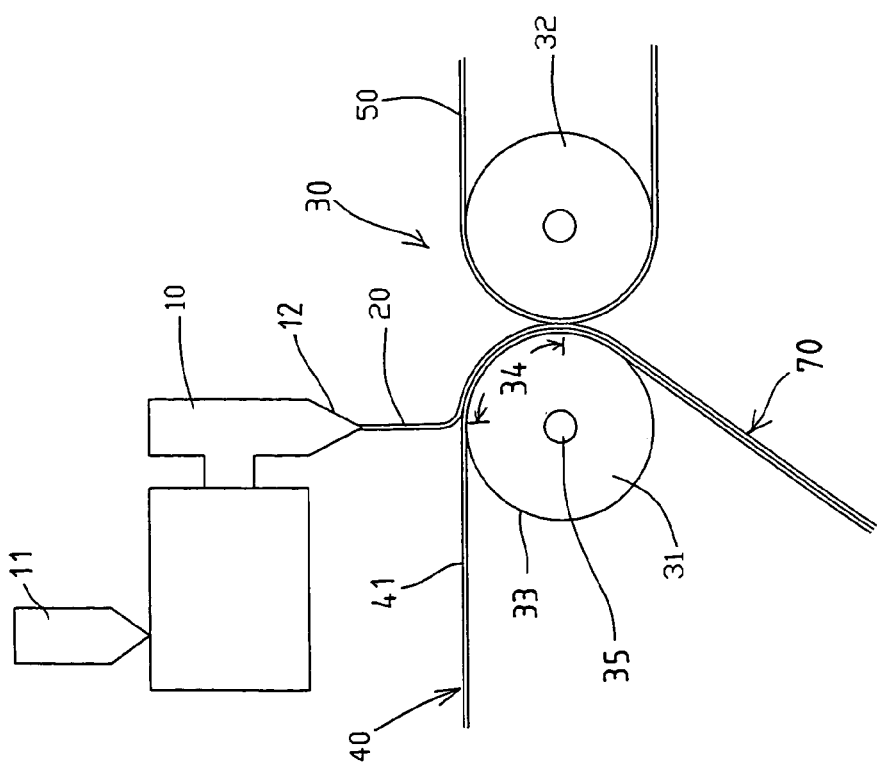
FIG. 1 is a plan schematic view illustrating a method for manufacturing or forming laminated synthetic leather in accordance with the present invention.

Referring to the drawings, and initially to FIGS. 1 and 2, a method in accordance with the present invention is provided for attaching or compressing a soft film or coating 20 and a textile carrier 50 together, to form a laminated synthetic leather 70 (FIG. 3), and to prevent the soft film or coating 20 from penetrating into the textile carrier 50 to a greater extent, and to form a soft or flexible laminated synthetic leather 70 having a spatial pattern 21 formed in or on the film or coating 20.

A squeezing or applying device 30 includes a lamination roller 31 and a carrying roller 32 disposed side by side, and slightly spaced away from each other, for squeezing the soft film or coating 20 and the textile carrier 50 together, or for laminating the soft film or coating 20 onto the textile carrier 50. The carrying roller 32 is preferably made of metal, plastic, rubber or other materials, and is provided to carry the textile carrier 50.

The lamination roller 31 is disposed close to or beside the carrying roller 32, and includes an outer peripheral portion 33 to support and to carry the soft film or coating 20, and is preferably made of heat conductive materials, such as metal, for dissipating heat from the soft film or coating 20, for example. The lamination roller 31 and the carrying roller 32 are shown to be disposed side by side. However, it is to be noted that the lamination roller 31 and the carrying roller 32 may also be disposed one above the other.

Figure 3:
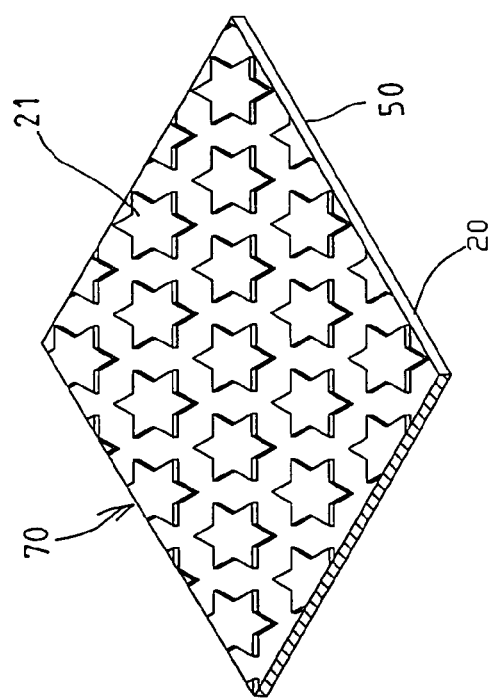
FIG. 3 is a perspective view illustrating a laminated synthetic leather to be manufactured with the method for manufacturing or forming laminated synthetic leather in accordance with the present invention.

As shown in FIGS. 1 and 2, a peel-away release liner 40 is further provided and wound or engaged around or carried by the lamination roller 31. The peel-away release liner 40 includes one surface 41 having a spatial pattern 42 formed or provided thereon, and the surface 41 is to be engaged onto the soft film or coating 20, for allowing the spatial pattern 42 to be imprinted or transmitted onto the soft film or coating 20, in order to form a spatial pattern 21 on the soft film or coating 20, as shown in FIG. 3.

Referring again to FIG. 1, an extruder machine 10 is provided to form the soft film or coating 20, and includes an inlet 11 for receiving the materials for forming the soft film or coating 20, and includes a port 12 for outlet the materials that have been heated or melted by the extruder machine 10, to form the soft film or coating 20.

For example, the materials for forming the soft film or coating 20 may be selected from thermoplastic polymers, such as thermoplastic urethane (TPU)+styrene butadiene rubber (SBR); thermoplastic urethane (TPU)+styrene ethylene butylenes styrene block copolymer (SEBS); thermoplastic urethane (TPU)+thermoplastic rubber (TPR); thermoplastic urethane (TPU)+ethylene propylene diene monomer rubber (EPDM); or the like.

The inclusion or the introducing of the other materials, such as styrene butadiene rubber (SBR), styrene ethylene butylenes styrene block copolymer (SEBS), thermoplastic rubber (TPR), ethylene propylene diene monomer rubber (EPDM) into the thermoplastic urethane (TPU) is provided to change the characteristics of the thermoplastic urethane (TPU), in order to form the soft film or coating 20 having a porous structure or having a number of perforations formed therein.

A foamable agent may further be added or introduced into the materials for forming the soft film or coating 20, in order to increase the softness or the flexibility of the film or coating 20. Colored powders, or color agents or solutions may further be added or introduced into the materials for forming the soft film or coating 20, in order to selectively form a colored soft film or coating 20.

In operation, as shown in FIG. 1, it is preferably that the heated or melted soft film or coating 20 is flowing or feeding downwardly out of or from the port 12 of the extruder machine 10, to engage with a top point or an upper portion of the lamination roller 31, and engaged with a segment 34 of the outer peripheral portion 33 of the lamination roller 31, and then leaving at a lateral point or a side portion of the lamination roller 31. The lamination roller 31 may thus be used to suitably support the heated or melted soft film or coating 20, and to allow the heated or melted soft film or coating 20 to have a uniformly distributed thickness, or to prevent the heated or melted soft film or coating 20 from having a changing thickness.

The lamination roller 31 preferably includes a passage 35 formed or provided therein for receiving cooling water or fluid therethrough, and for allowing the lamination roller 31 and thus the release liner 40 and the heated or melted soft film or coating 20 to be suitably cooled by the cooling water or fluid flowing through the passage 35 of the lamination roller 31.

It is to be noted that the flowing speed of the cooling water or fluid flowing through the passage 35 of the lamination roller 31 may be controlled to determine the temperature of the heated or melted soft film or coating 20, for allowing the heated or melted soft film or coating 20 to be suitably pressed onto the textile carrier 50. The rotational speed of the lamination roller 31 may also be controlled to change the supporting time of the film or coating 20 on the roller 31 and to determine the temperature of the heated or melted soft film or coating 20.

As shown in FIG. 1, as mentioned above, the rollers 31, 32 may be disposed side by side, to allow the heated or melted soft film or coating 20 to be carried on all of the segment 34 of the outer peripheral portion 33 of the lamination roller 31. Alternatively, the carrying roller 32 may also be disposed or arranged in different angular position relative to the lamination roller 31 (not shown), to change the engaging portion of the heated or melted soft film or coating 20 with the segment 34 of the outer peripheral portion 33 of the lamination roller 31.

Further alternatively, the port 12 of the extruder machine 10 may also be changed to different position relative to the lamination roller 31 (not shown), to change the engaging portion of the downwardly fed film or coating 20 with the peel-away release liner 40 and the segment 34 of the outer peripheral portion 33 of the lamination roller 31. Furthermore, the port 12 of the extruder machine 10 may also be changed to different angular position relative to the lamination roller 31 (not shown), to suitably supply the film or coating 20 toward the lamination roller 31.

After the heated or melted soft film or coating 20 has been suitably cooled to the required temperature by the lamination roller 31 and/or the cooling water or fluid, the film or coating 20 and the textile carrier 50 may be compressed together by the rollers 31, 32, in order to form the laminated synthetic leather 70 (FIG. 3). In addition, the suitably cooled film or coating 20 may be prevented from completely or fully penetrated into the textile carrier 50 to a greater extent.

For example, the film or coating 20 may be penetrated into the textile carrier 50 to an extent of about 3–45 vol. %, for allowing the laminated synthetic leather 70 to have a suitable softness or flexibility. The spatial pattern 42 of the peel-away release liner 40 may thus be imprinted or transmitted onto the soft film or coating 20, in order to form a spatial pattern 21 on the soft film or coating 20, when the film or coating 20 and the textile carrier 50 are compressed together by the rollers 31, 32, to form the laminated synthetic leather 70 (FIG. 3).

The laminated synthetic leather 70 may then be applied or attached onto various objects when the peel-away release liner 40 is peeled off or peeled away from the film or coating 20 and the textile carrier 50, and the pattern 21 thus formed on the film or coating 20 may be seen by people.

Figure 4:
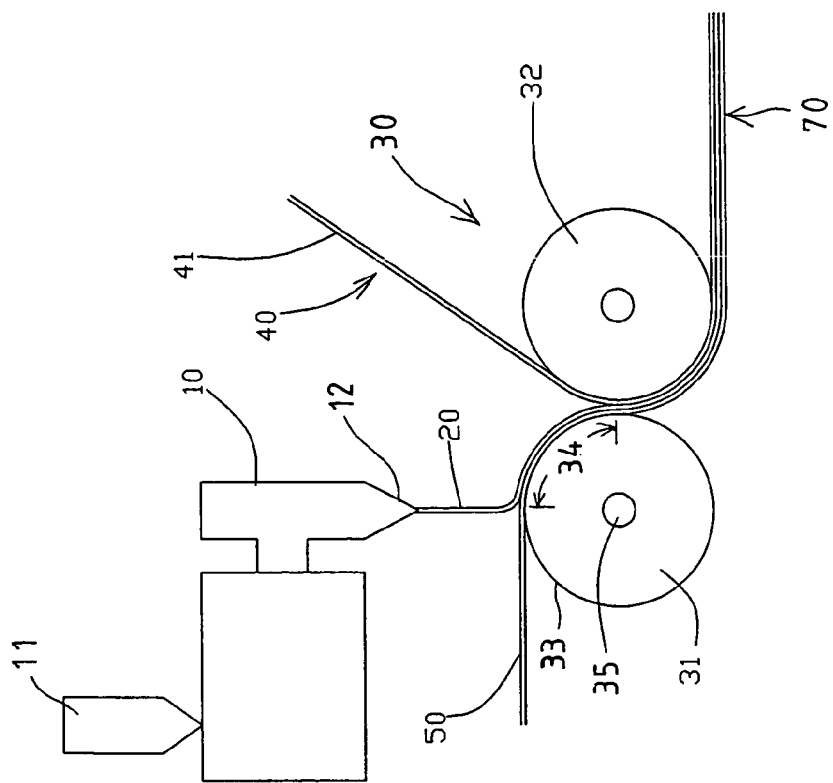
FIG. 4 is a plan schematic view similar to FIG. 1, illustrating another arrangement for manufacturing or forming the laminated synthetic leather in accordance with the present invention.
Figure 5:
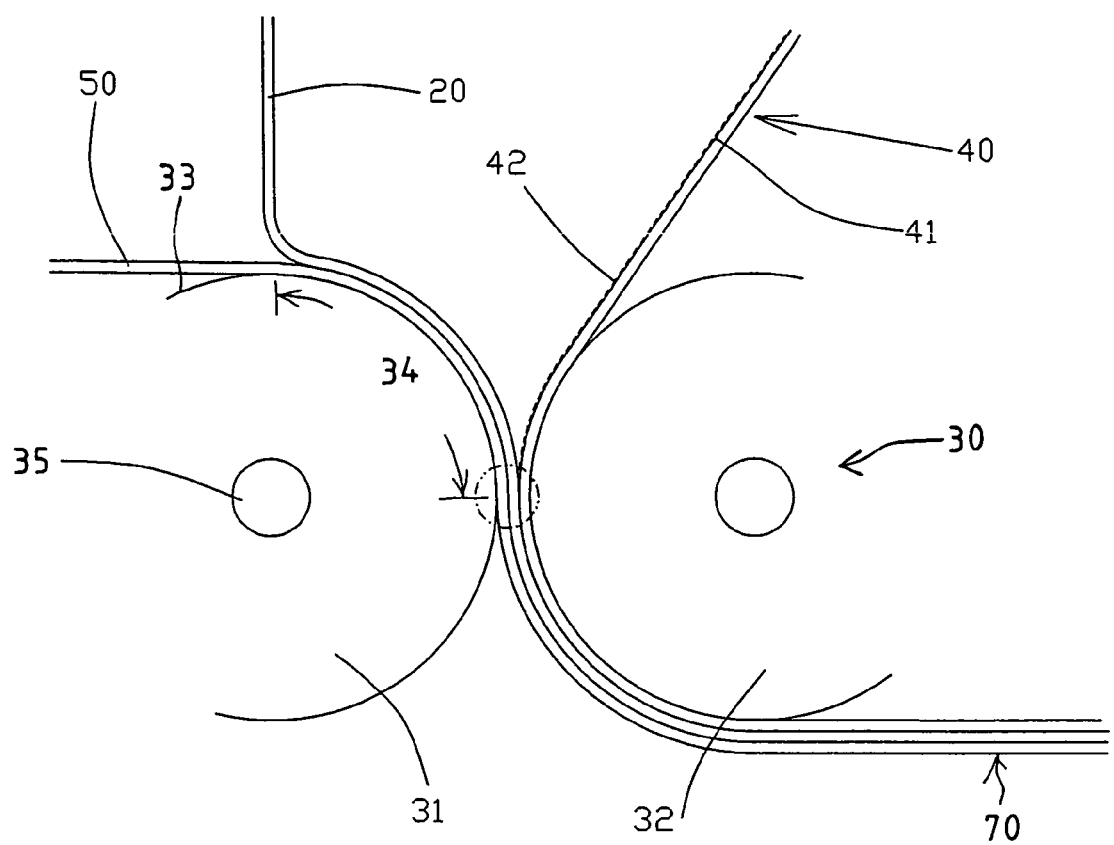
FIG. 5 is an enlarged partial plan schematic view of FIG. 4, illustrating the operation of the method for manufacturing or forming laminated synthetic leather.

Alternatively, as shown in FIGS. 4 and 5, the textile carrier 50 may be wound or engaged around or carried by the lamination roller 31, instead of being carried by the carrying roller 32; and the peel-away release liner 40 may be wound or engaged around or carried by the carrying roller 32, instead of being carried by the lamination roller 31.

Figure 6:
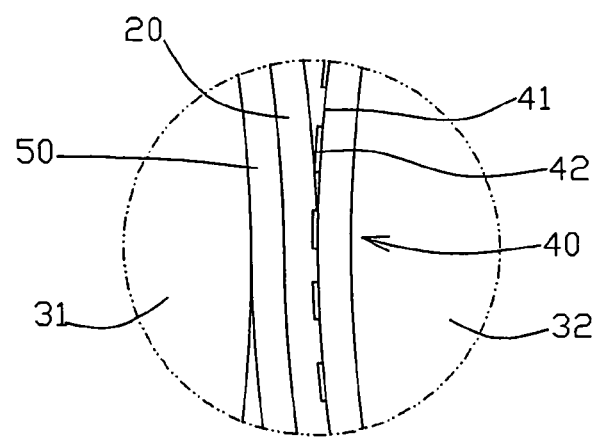
FIG. 6 is a further enlarged partial plan schematic view of FIG. 5, illustrating the formation of the laminated synthetic leather.

As shown in FIGS. 5 and 6, the spatial pattern 42 of the peel-away release liner 40 may also be forced or engaged into or imprinted or transmitted onto the soft film or coating 20, in order to form the spatial pattern 21 on the soft film or coating 20, when the film or coating 20 and the textile carrier 50 are compressed together by the rollers 31, 32, to form the laminated synthetic leather 70.

It is further to be noted that one or more peel-away release liners 40 may be provided and each having one or more flat patterns and/or one or more spatial patterns formed or applied or provided thereon, and the peel-away release liners 40 may be selectively or changeably engaged or attached onto the lamination roller 31 and the carrying roller 32, in order to form or imprint various or different patterns onto the film 20.

Accordingly, the method in accordance with the present invention may be used for preventing the soft film or coating from penetrating into the textile carrier to a greater extent, and thus for forming a soft or flexible laminated synthetic leather, and for forming or applying one or more spatial patterns on the soft film or coating.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method for manufacturing or forming a laminated synthetic leather, said method comprising:
   providing a carrying roller,
   engaging a textile carrier onto said carrying roller,
   providing and disposing a lamination roller beside said carrying roller, and spaced away from said carrying roller,
   engaging a release liner onto said lamination roller, said release liner including a surface having a pattern provided thereon,
   providing an extruder machine to extrude a material into a film,
   downwardly feeding said film onto said release liner that is carried on said lamination roller, to have said film carried on a segment of an outer peripheral portion of said lamination roller,
   providing a passage in said lamination roller,
   feeding a cooling fluid through said passage of said lamination roller to cool said lamination roller and to cool said release liner and said film when said film is carried on said segment of said outer peripheral portion of said lamination roller, and
   compressing said release liner and said film and said textile carrier together with said carrying roller and said lamination roller, to form said laminated synthetic leather, and to have said pattern of said release liner transmitted onto said film.

2. The method as claimed in claim 1 further comprising introducing a foamable agent into said material for forming said film, and for increasing a softness of said film.

3. The method as claimed in claim 1, wherein said pattern of said release liner is a three-dimensional pattern.

4. The method as claimed in claim 1, wherein said material is selected from thermoplastic polymer materials.

5. The method as claimed in claim 4, wherein said thermoplastic polymer materials are a mixture of thermoplastic urethane (TPU)+styrene butadiene rubber (SBR).

6. The method as claimed in claim 4, wherein said thermoplastic polymer materials are a mixture of thermoplastic urethane (TPU)+styrene ethylene butylenes styrene block copolymer (SEBS).

7. The method as claimed in claim 4, wherein said thermoplastic polymer materials are a mixture of thermoplastic urethane (TPU)+thermoplastic rubber (TPR).

8. The method as claimed in claim 4, wherein said thermoplastic polymer materials are a mixture of thermoplastic urethane (TPU)+ethylene propylene diene monomer rubber (EPDM).

9. A method for manufacturing or forming a laminated synthetic leather, said method comprising:
   providing a carrying roller,
   providing and disposing a lamination roller beside and spaced away from said carrying roller,
   engaging a textile carrier onto said lamination roller,
   engaging a release liner onto said carrying roller, said release liner including a surface having a pattern provided thereon,
   providing an extruder machine to extrude a material into a film,
   feeding said film onto said textile carrier and said lamination roller, to have said film carried on said textile carrier, and carried on a segment of an outer peripheral portion of said lamination roller,
   providing a passage in said lamination roller,
   feeding a cooling fluid through said passage of said lamination roller to cool said lamination roller and to cool said release liner and said film when said film is carried on said segment of said outer peripheral portion of said lamination roller, and
   compressing said textile carrier and said film and said release liner together with said carrying roller and said lamination roller, to form said laminated synthetic leather, and to have said pattern of said release liner transmitted onto said film.

10. The method as claimed in claim 9 further comprising introducing a foamable agent into said material for forming said film, and for increasing a softness of said film.

11. The method as claimed in claim 9, wherein said material is selected from thermoplastic polymer materials.

12. The method as claimed in claim 11 wherein said thermoplastic polymer materials are a mixture of thermoplastic urethane (TPU)+styrene butadiene rubber (SBR).

13. The method as claimed in claim 11 wherein said thermoplastic polymer materials are a mixture of thermoplastic urethane (TPU)+styrene ethylene butylenes styrene block copolymer (SEBS).

14. The method as claimed in claim 11 wherein said thermoplastic polymer materials are a mixture of thermoplastic urethane (TPU)+thermoplastic rubber (TPR).

15. The method as claimed in claim 11 wherein said thermoplastic polymer materials are a mixture of thermoplastic urethane (TPU)+ethylene propylene diene monomer rubber (EPDM).

16. The method as claimed in claim 9 wherein said pattern of said release liner is a three-dimensional pattern.

* * * * *